(12) United States Patent
Bakshi et al.

(10) Patent No.: US 6,804,717 B1
(45) Date of Patent: Oct. 12, 2004

(54) PROVIDING QUALITY OF SERVICE BY TRANSMITTING XML FILES INDICATING REQUESTED RESOURCES

(75) Inventors: Sanjay Bakshi, Beaverton, OR (US); Rajendra S. Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,232

(22) Filed: Mar. 30, 2000

(51) Int. Cl.[7] .................. G06F 15/16; G06F 15/173; G01R 31/08
(52) U.S. Cl. .................. 709/225; 709/229; 709/238; 370/229; 370/235
(58) Field of Search .................. 709/223–225, 709/227–229; 370/230

(56) References Cited

U.S. PATENT DOCUMENTS

| | | | | |
|---|---|---|---|---|
| 5,768,271 A | * | 6/1998 | Seid et al. | 370/389 |
| 5,894,471 A | * | 4/1999 | Miyagi et al. | 370/230 |
| 6,411,601 B1 | * | 6/2002 | Shaffer et al. | 709/229 |
| 6,459,682 B1 | * | 10/2002 | Ellesson et al. | 370/235 |
| 6,563,794 B1 | * | 5/2003 | Takashima et al. | 370/236 |

* cited by examiner

Primary Examiner—David Wiley
Assistant Examiner—Joseph E Avellino
(74) Attorney, Agent, or Firm—Fish & Richardson P.C.

(57) ABSTRACT

Providing quality of service includes reserving resources to transmit data from a source location to a destination location and transmitting the data from the source location to the destination location using the reserved resources and based on characteristics of the data and of the destination location.

26 Claims, 5 Drawing Sheets

PROVIDING QUALITY OF SERVICE BY TRANSMITTING XML FILES INDICATING REQUESTED RESOURCES

BACKGROUND

This invention relates to providing quality of service.

The popularity of the World Wide Web and the emergence of the Internet as a publishing medium have led to increased use of the Internet for interactive, multimedia applications, e.g., video and audio conferencing. Most of these applications involve streaming and downloading multimedia content across the Internet. Streaming allows a user to start viewing data as a continuous stream before receiving the entire multimedia file. For streaming to work effectively, these applications may require some Quality of Service (QoS) guarantees in terms of traffic prioritization, bandwidth reservation, and delay guarantees.

QoS provides the ability to provision bandwidth and other resources so that different data service levels can be assigned to specific data types, applications, or users. With QoS, higher priority data types receive preferential access to bandwidth and other resources while lower priority data types still receive a minimally acceptable amount of bandwidth. Using RSVP (resource reservation setup protocol), an application can reserve resources to transmit the data along a route from a source to a destination. RSVP-enabled routers schedule and prioritize all of the packets of data to fulfill the QoS requirements. Thus, QoS can ensure a guaranteed level of end-to-end service by guaranteeing, for example, data throughput, data bandwidth and other resource sharing, e.g., a server on the Internet, to another location, e.g., the user, for a certain amount of time.

Referring to the example shown in FIG. 1, the total bandwidth available between two end-points, e.g., a user 10a and a web server 22, across a network segment 16 is 500 kbits, and users 10a and 10b share the connection to the network segment 16 via an Internet service provider (ISP) router 12. User 10a is trying to stream a 300 kbit video stream 14 from the web server 22 on the Internet 20 across the network segment 16 while user 10b is participating in a video conference 18 with a corporate office 24 using the same network segment 16 as user 10a. User 10b may have already reserved bandwidth, e.g., 400 kbits, across the network segment 16 using RSVP. Thus, even though user 10a might reasonably expect to receive the video stream 14 without any loss because 300 kbits fit on the 500 kbit network segment 16, user 10a will, actually experience loss, e.g., video freezing because the user 10a is unaware of other traffic on the 500 kbit network segment 16. In this example, even if user 10a knew of the 500 kbit capacity across the network segment 16 and consequently chose the 300 kbit video stream 14 instead of a lower quality video stream, e.g., 200 kbits, or a higher quality stream, e.g., 600 kbits, user 10a may still need to resort to trial-and-error to choose the appropriately sized video stream 14.

DESCRIPTION

Figure 1:
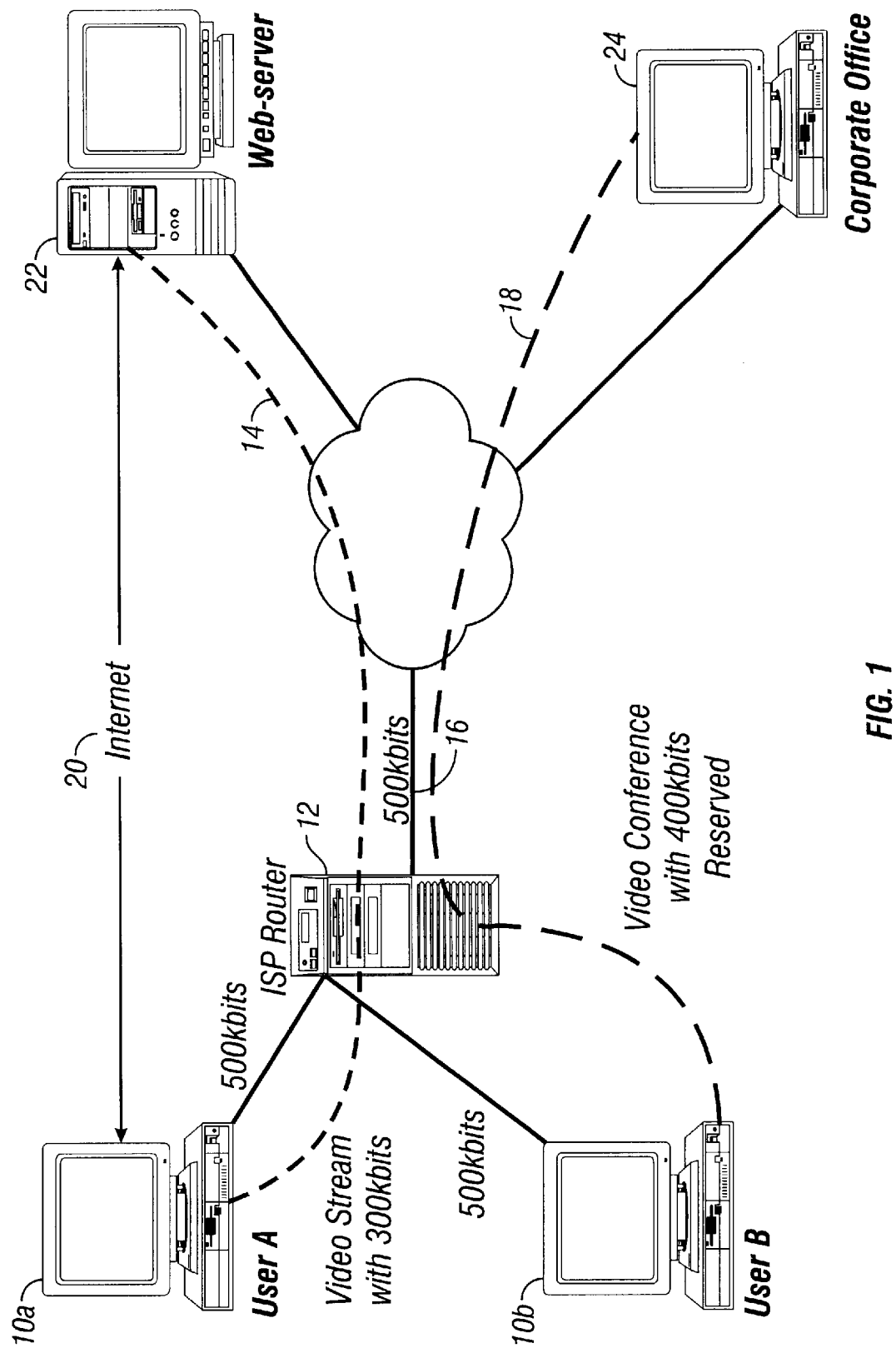
FIG. 1 illustrates two examples of data transmission over the Internet.
Figure 2:
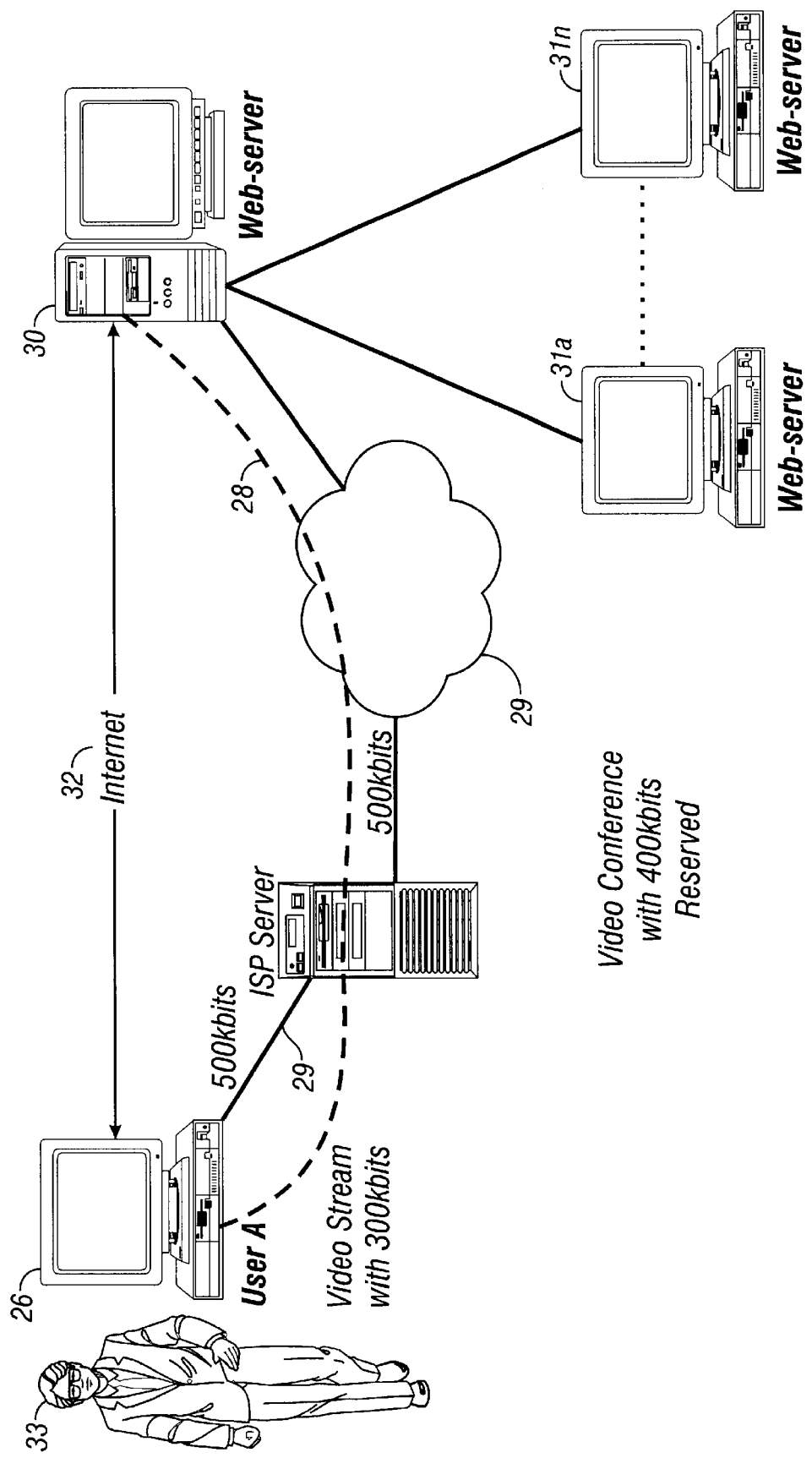
FIG. 2 illustrates an example of data transmission over the Internet.

FIG. 2 shows data transmission using an embodiment of the invention which allows a client 26 to automatically receive a proper QoS for streaming data 28, e.g., multimedia data, from a web server 30 over a network 29 with minimal or no knowledge on the part of a user 33 of the client 26 about the workings of the Internet 32 and its associated circuitry. Resources on the network 29 are reserved transparent to the user 33 from the server 30 to the client 26. The data stream whose bandwidth resource requirements can be met in a guaranteed manner by the network 29 is automatically selected.

To achieve such data streaming, the client 26 and the server 30 ideally should both support automatic QoS service, e.g., by having an automatic QoS service software module (not shown), and use the same reservation setup mechanism, e.g., RSVP. The automatic QoS service software module may be installed as part of the client's and server's operating systems or streaming software. Additionally, all of the routers used on the network 29 ideally should use the same reservation setup mechanism as the client 26 and the server 30.

Figure 3:
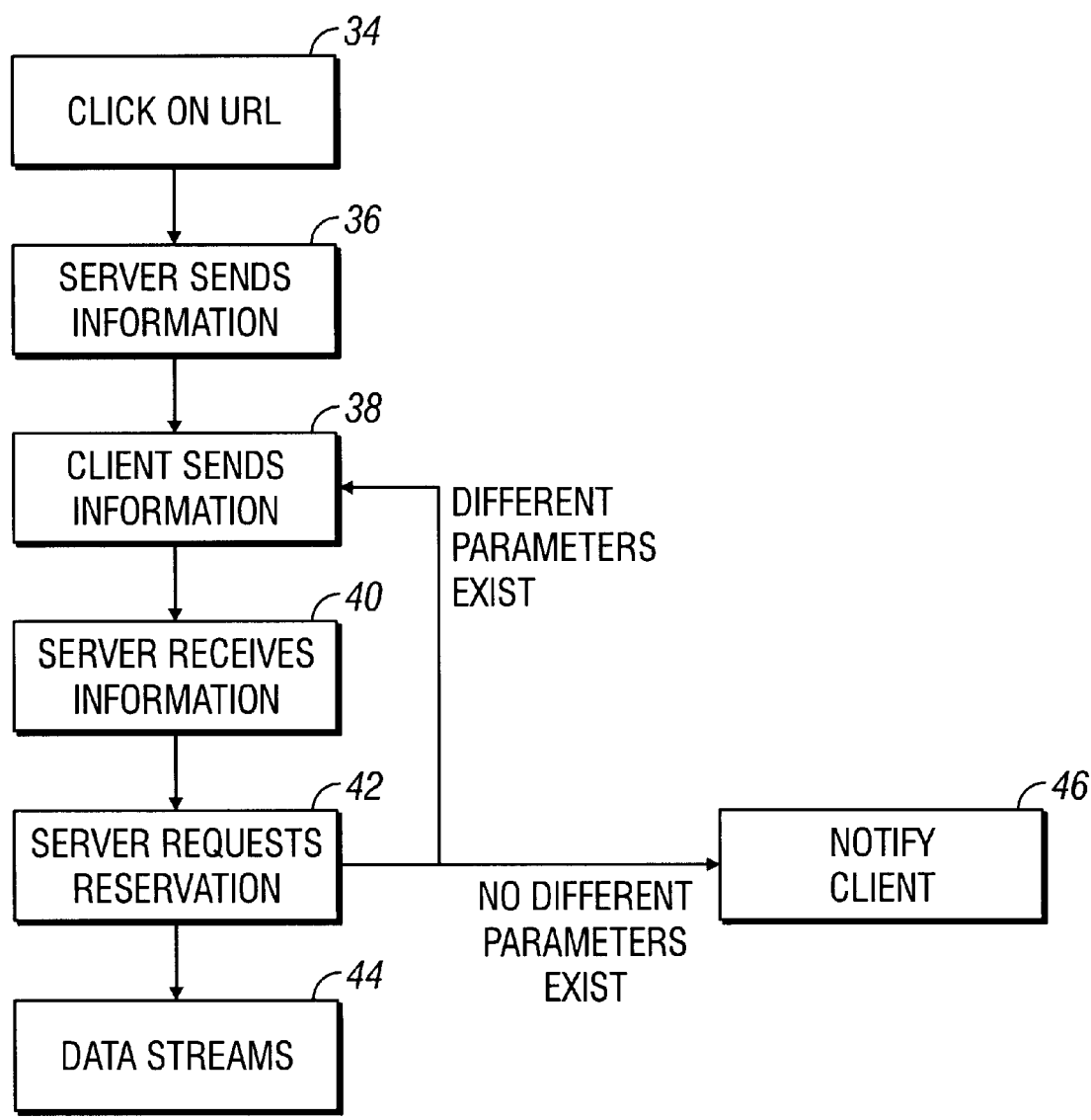
FIG. 3 is a flowchart of an automatic QoS service in accordance with an implementation of the invention.

In an embodiment shown in FIGS. 2 and 3, when the user 33 clicks 34 on a URL (uniform resource locator) on a web page from the server 30, the server 30 sends (downloads) 36 information, e.g., an extensible markup language (XML), file, describing the characteristics of the data stream associated with the URL to the client 26. Tags on the data 28, e.g., code in XML, may help identify its priority level and associated QoS requirements. Once tagged, the data 28 is capable of describing itself to any application enabled to read the tag. The client 26 sends 38 to the server 30 a request including the address of the client 26 and a message including flow specification parameters to the server 30. The flow specification parameters specify how to stream the data, e.g., at 300 kbits, and are based on the information sent 36 by the server 30. The server 30 receives 40 the client's request and message and requests 42 a reservation using a reservation setup mechanism, e.g., RSVP. The server 30 can generate an RSVP path-information message and send the message to the client 26. When the client 26 receives the RSVP path-information message, it sends an RSVP path-reservation message to establish a reservation. If a reservation is established, the data streams (downloads) 44 from the server 30 to the client 26 using the reserved resources and based on the information sent 38 by the client 26 that was based at least in part on the information sent 36 by the server 30. If a reservation is not established, the client 26 either sends 38 the server 30 a different message including different flow specification parameters, or the user 33 receives 46 notification that the client's underlying network cannot support the required QoS because no other flow specification parameters are available.

Figure 4:
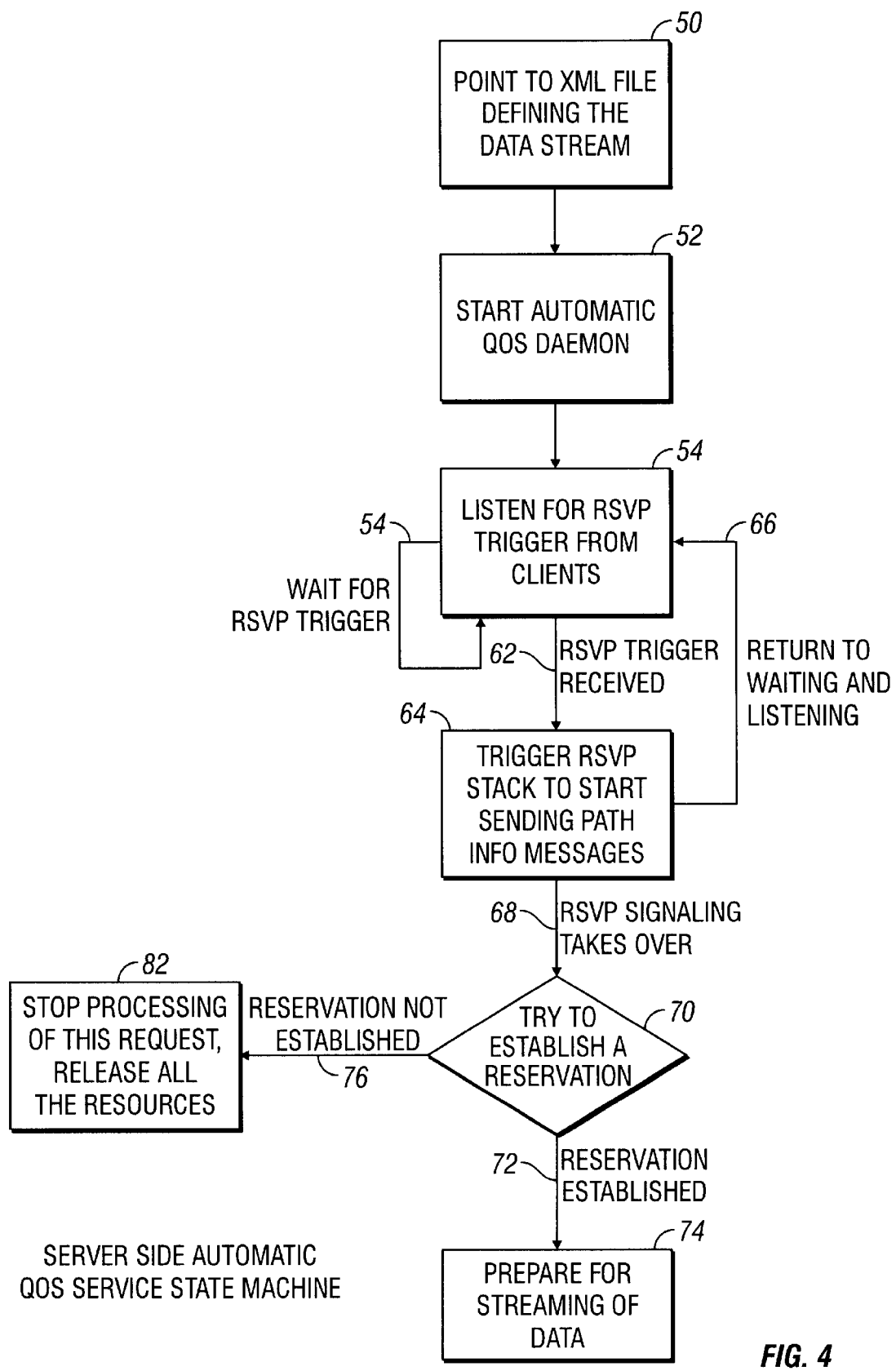
FIG. 4 is a flowchart of an automatic QoS service software module on the server side in accordance with an implementation of the invention.
Figure 5:
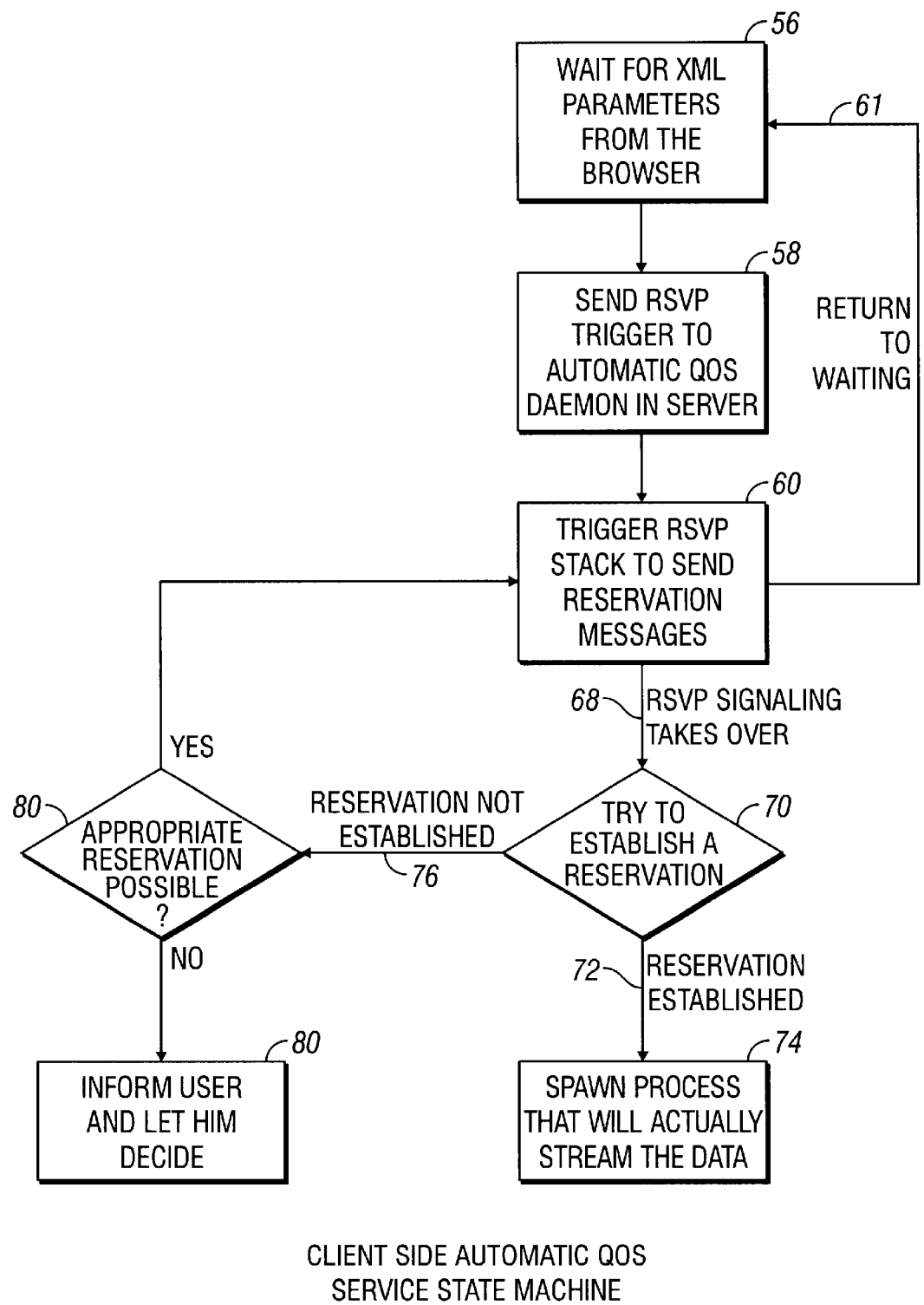
FIG. 5 is a flowchart of an automatic QoS service software module on the client side in accordance with an implementation of the invention.

Referring to FIGS. 2, 4, and 5, in one embodiment of the invention, the URL of performance-sensitive data 28, e.g., a multimedia stream, on the server 30 points 50 to a page, e.g., an XML file, identifying characteristics of the data 28. The XML file defines various QoS tags that indicate the level of QoS required from the network 29 for a smooth streaming session. The types of tags defined in the XML file depend upon the type of data 28. For example, tags for an audio/video stream could include:

Address of the server, i.e., unicast address;

Data type;

Audio codec (compression/decompression): audio encoding format and QoS parameters, e.g., sampling rate and size, bandwidth requirements, and delay requirements;

Video codec: video encoding format and QoS parameters; and

Stereo audio: its availability and corresponding QoS parameters.

A server automatic QoS service software module ("server module") installed on the server 30 starts 52 as a daemon (a process that runs in the background and performs certain tasks in response to certain events). The daemon waits and listens 54 for reservation trigger requests, e.g., RSVP trigger requests, from potential clients and periodically generates path-information messages to set up reservations. Similarly, a client automatic QoS service software module ("client module") installed on the client 26 waits 56 for information about the data 28 from the client's web browser.

When the user 33, while browsing the Internet, clicks on the URL of the data 28, the server 30 downloads the XML file to the client's browser. The server 30 may act as a main server and keep copies of the data 28 on multiple servers 31*a–n*. If it does, the server 30 can enable load sharing by keeping track of the number of potential clients trying to view the data 28 and directing the potential clients to different servers 31*a–n*.

After parsing the XML file, the browser forwards information, e.g., data stream related parameters, extracted from the XML file, to the client module. The client module sends 58 an RSVP trigger request including the address of the client 26 to the server module. The client module also triggers 60 a client RSVP stack, installed as part of the client's RSVP mechanism, to start sending RSVP reservation messages to the server 30. The RSVP reservation messages include information about the destination location, e.g., flow specification parameters, determined by the client module from the information forwarded by the browser. The client module then returns 61 to waiting 56 for information about new data 28 from the browser.

After receiving 62 the RSVP trigger request, the server module triggers 64 a server RSVP stack, installed as part of the server's RSVP mechanism, to start sending RSVP path information messages to the client 26. The server module returns 66 to waiting and listening 54 for new RSVP trigger requests from potential clients.

At this point, on both the client 26 and server 30 sides, the RSVP mechanism (RSVP signaling) takes over 68 for the client and server modules and tries 70 to reserve the necessary resources to transmit the data from the server 30 to the client 26. If the reservation is established 72, the client 26 and server 30 prepare 74 for streaming of the data 28. If the reservation is not established 76, the client module 26 checks 78 to see if an appropriate reservation is possible. If the client module can determine flow specification parameters from the data stream related parameters that the client module has not yet sent to the server module in an RSVP reservation message, the client module triggers 60 the client RSVP stack to send another RSVP reservation message containing these flow specification parameters to the server 30 and the process continues as described above from the triggering 60. If the client module cannot determine such flow specification parameters, the client module informs 80 the user 33 that a reservation cannot be set up because the underlying network 29 cannot support the required QoS. The server module stops 82 processing the client module's request and releases all of its resources from this request.

The user 33 may still decide to receive the data stream, in which case no QoS is available.

All of the routers on the network 29 ideally should support the same reservation mechanism as the client 26 and the server 30. FIGS. 4 and 5 show using RSVP as the reservation setup mechanism, but a different reservation setup mechanism, e.g., differentiated services, may be used to establish QoS after the daemon starts 52. Differentiated services ensure QoS by relying on policy-based mechanisms that allow differentiation among different traffic streams based on reserved bandwidth for each of the service classes. Under this mechanism, a data stream gets preferential treatment based on an out-of-band configuration from a policy server. Similarly, native ATM (asynchronous transfer mode) services can be used to guarantee QoS in an ATM environment.

Other embodiments are within the scope of the following claims.

What is claimed is:

1. A method comprising:

using an existing reservation set up mechanism to request resources to transmit data from a source location to a destination location and to produce an XML file indicative of requested resources, which file indicates reservation request setup parameters of said requested resources and which file is in a format which is different than a format used by said existing reservation set up mechanism; and determining at least one network path from the source location to the destination location and determining in each network path if the network path can provide said requested resources by using said file to query resources in said each network path; and reserving and using said requested resources if a network path is found that can handle the resources.

2. The method of claim 1 in which the resources include flow specification parameters for the data.

3. The method of claim 1 in which the existing reservation setup mechanism is resource reservation setup protocol.

4. The method of claim 1 wherein said transmitting comprises sending information including characteristics of the data from a source location to a destination location.

5. The method of claim 1 wherein said transmitting comprises sending information including characteristics of the destination location from a destination location to a source location.

6. A method as in claim 1, wherein said XML file has tags which represent different characteristics of the requested resources.

7. An article comprising a computer-readable medium which stores computer-executable instructions, the instructions causing a computer to:

use an existing reservation setup mechanism to reserve resources to transmit data from a source location to a destination location and produce resource information indicative of said reserved resources, to produce an XML file which indicates reservation request setup parameters of said requested resources, which file is in a format which is different than a format used by said existing reservation set up mechanism; and determining in each network path if the network path can provide said requested resources by using said file to query resources in said each network path; and reserving and using said requested resources if a network path is found that can provide the resources.

8. The article of claim 7 in which the resources include flow specification parameters from the data.

9. The article of claim 7 in which the existing reservation setup mechanism is resource reservation setup protocol.

10. The article of claim 7 wherein said computer transmits comprises sending information including characteristics of the data from a source location to a destination location.

11. The article of claim 7 wherein said computer to transmit comprises sending information including characteristics of the destination location from a destination location to a source location.

12. An article as in claim 7, wherein said XML file has tags which represent different characteristics of the requested resources.

13. An apparatus comprising:
   a reservation mechanism to reserve resources to transmit data from a source location to a destination location running at least at one of said source location or said destination location, which produces a file that indicates multiple different reservation request setup parameters of said requested resources, which file is in a format which is different than a format used by said reservation mechanism and has portions that describe said multiple different characteristics of information to be sent; and
   an access mechanism, determining in each network path if the network path can provide said requested resources; and reserving and using said requested resources if a network path is found that can handle the resources by using said file to query resources in said each network path.

14. The apparatus of claim 13 in which the reservation mechanism includes flow specification parameters for the data setup protocol.

15. The apparatus of claim 13 further comprising a source module to transmit information including characteristics of the data from a source location to a destination location.

16. The apparatus of claim 13 further comprising wherein said destination module which transmits comprises sending information including characteristics of the destination location from a destination location to a source location.

17. A method comprising:
   specifying resources to transmit data from a source location to a destination location using a resource specification mechanism, which produces a file which has different tags that each represent different reservation request setup parameters of said requested resources, which file is in a format which is different than a format used by said specifying;
   determining network parameters of paths between the source location and the destination and determining if a path can provide the reserved resources and reserving the resources if so by using said file to query resources in said each network path; and
   if resources are not reserved, notifying the destination location.

18. The method of claim 17 in which repeated attempts are made to reserve resources.

19. The method of claim 17 in which the resources are automatically reserved using resource reservation setup protocol.

20. The method of claim 17 further comprising transmitting information including characteristics of the data from a source location to a destination location.

21. The method of claim 17 further comprising transmitting information including characteristics of the destination location from a destination location to a source location.

22. An apparatus comprising:
   an existing reservation mechanism to specify resources including at least a flow specification parameter and to produce a file which has different tags that each represent different reservation request setup parameters of said requested resources and which file is in a format which is different than a format used by said existing reservation mechanism;
   a module which sends information to a network path to determine if said network path supports said resources and to reserve said resources if so by using said file to query resources in said each network path;
   a streaming mechanism to transmit the data if resources are reserved from the source location to the destination location using the reserved resources and based on characteristics of the data and of the destination information; and
   a notification mechanism to notify the destination location if resources are not reserved.

23. The apparatus of claim 22 in which the reservation mechanism includes resource reservation setup protocol.

24. An apparatus as in claim 22, further comprising a streaming mechanism to transmit the data if resources are reserved from the source location to the destination location using the reserved resources and based on characteristics of the data and of the destination information; and
   a notification mechanism to notify the destination location if resources are not reserved.

25. An apparatus comprising:
   a browser at a destination location to receive source information including characteristics of data from a source module at a source location and forward at least some of the source information to a destination module, said source information which has different tags that each represent different reservation request setup parameters of said requested resources as a file which is in a format which is different than a format used by said browser;
   a destination module to transmit destination information to the source module;
   a reservation mechanism to reserve resources to transmit the data from a source location to a destination location; and
   determining in each network path if the network path can provide said requested resources; and reserving and using said requested resources if a network path is found that can handle the resources by using said file to query resources in said each network path;
   a streaming mechanism to transmit the data from the source location to the destination location using the reserved resources and based on the source information and on the destination information.

26. The apparatus of claim 25 in which the reservation mechanism includes resource reservation setup protocol.

* * * * *